(12) United States Patent
Theurich et al.

(10) Patent No.: US 10,526,073 B2
(45) Date of Patent: Jan. 7, 2020

(54) WINGTIP DEVICE OF A WING, AND ALSO A WING WITH SUCH A WINGTIP DEVICE

(75) Inventors: Frank Theurich, Hude (DE); Jan Himisch, Braunschweig (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 1069 days.

(21) Appl. No.: 14/232,842

(22) PCT Filed: Jul. 16, 2012

(86) PCT No.: PCT/EP2012/002986
§ 371 (c)(1),
(2), (4) Date: Sep. 24, 2014

(87) PCT Pub. No.: WO2013/007396
PCT Pub. Date: Jan. 17, 2013

(65) Prior Publication Data
US 2015/0041597 A1 Feb. 12, 2015

Related U.S. Application Data

(60) Provisional application No. 61/507,689, filed on Jul. 14, 2011.

(30) Foreign Application Priority Data

Jul. 14, 2011 (DE) .................. 10 2011 107 251

(51) Int. Cl.
*B64C 23/06* (2006.01)
(52) U.S. Cl.
CPC .......... *B64C 23/069* (2017.05); *B64C 23/065* (2013.01); *Y02T 50/164* (2013.01)

(58) Field of Classification Search
CPC ..................... B64C 23/065; B64C 23/069
(Continued)

(56) References Cited

U.S. PATENT DOCUMENTS 3,270,988 A * 9/1966 Cone, Jr. ............... B64C 23/065
244/199.4
4,093,160 A * 6/1978 Reighart, II ............ B64C 23/06
244/113

(Continued)

FOREIGN PATENT DOCUMENTS

| CA | 2669604 A1 | 5/2008 |
|---|---|---|
| CN | 101535124 A | 9/2009 |
| WO | 2008061739 A1 | 5/2008 |

OTHER PUBLICATIONS

European Patent Office, European Patent Search Report for Application No. PCT/US2012/002986 dated Nov. 14, 2012.
(Continued)

*Primary Examiner* — Marc Burgess
(74) *Attorney, Agent, or Firm* — Lorenz & Kopf LLP (57) ABSTRACT

A wingtip device for a wing is provided. The wingtip device has an inner end and an outer end, and in which the local dihedral of the wingtip device increases or reduces from the inner end to the outer end, with a pressure-side flow surface and a suction-side flow surface. At least two ancillary wing sections are arranged on the wingtip device, projecting in each case from the flow surface of the wingtip device. The ancillary wing sections in each case form an interface with the surface of the wingtip device; which interfaces are located spaced apart from one another. A wing with such a wingtip device is also provided.

13 Claims, 6 Drawing Sheets

(58) Field of Classification Search
USPC .................................. 244/199.2, 199.3, 199.4
See application file for complete search history.

(56) References Cited

U.S. PATENT DOCUMENTS

| | | | | |
|---|---|---|---|---|
| D259,554 S * | 6/1981 | Parise | ........................ | 244/199.4 |
| 4,598,885 A * | 7/1986 | Waitzman | ............... | B64C 3/185 |
| | | | | 244/13 |
| 4,605,183 A * | 8/1986 | Gabriel | ................ | A63H 27/007 |
| | | | | 244/46 |
| 4,671,473 A * | 6/1987 | Goodson | ............... | B64C 23/065 |
| | | | | 244/199.4 |
| 4,674,709 A * | 6/1987 | Welles | .................. | B64C 23/065 |
| | | | | 244/199.4 |
| 4,674,789 A | 6/1987 | Watjer et al. | | |
| 4,722,499 A * | 2/1988 | Klug | ..................... | B64C 23/065 |
| | | | | 244/199.4 |
| 5,102,068 A | 4/1992 | Gratzer | | |
| 6,345,790 B1 * | 2/2002 | Brix | ...................... | B64C 23/076 |
| | | | | 244/199.4 |
| 6,578,798 B1 * | 6/2003 | Dizdarevic | .......... | B64C 23/065 |
| | | | | 244/198 |
| 7,900,876 B2 * | 3/2011 | Eberhardt | ............. | B64C 23/065 |
| | | | | 244/199.4 |
| 8,439,313 B2 * | 5/2013 | Rawdon | ................ | B64C 23/065 |
| | | | | 244/199.4 |
| 8,727,285 B2 * | 5/2014 | Theurich | ............... | B64C 23/065 |
| | | | | 244/199.4 |
| 8,783,623 B2 * | 7/2014 | Schaber | ................ | B64C 23/065 |
| | | | | 244/199.3 |
| 8,936,219 B2 * | 1/2015 | Roman | ................. | B64C 23/069 |
| | | | | 244/199.4 |
| 8,944,386 B2 * | 2/2015 | Gratzer | ................ | B64C 23/069 |
| | | | | 244/199.4 |
| 9,033,282 B2 * | 5/2015 | Wright | ................. | B64C 23/065 |
| | | | | 244/199.4 |
| 9,199,727 B2 * | 12/2015 | Wright | ................. | B64C 23/065 |
| 9,302,766 B2 * | 4/2016 | Gratzer | ................ | B64C 23/069 |
| 9,511,850 B2 * | 12/2016 | Zaman | ................. | B64C 23/065 |
| 9,988,142 B2 * | 6/2018 | Heller | ................... | B64C 23/065 |
| 2009/0065632 A1 * | 3/2009 | Cazals | ...................... | B64C 5/02 |
| | | | | 244/15 |
| 2009/0084904 A1 * | 4/2009 | Detert | ................... | B64C 23/065 |
| | | | | 244/199.4 |
| 2010/0019094 A1 * | 1/2010 | Theurich | ............... | B64C 23/065 |
| | | | | 244/199.4 |
| 2011/0024556 A1 | 2/2011 | Cazals et al. | | |
| 2012/0312928 A1 * | 12/2012 | Gratzer | ................ | B64C 23/065 |
| | | | | 244/199.4 |
| 2018/0050790 A1 * | 2/2018 | Whitehouse | .......... | B64C 23/069 |

OTHER PUBLICATIONS

State Intellectual Property Office of the People's Republic of China, Office Action for Chinese Patent Application No. 201280034955.8 dated May 29, 2015.
Australian Patent Office, Australian Office Action for Australian Patent Application No. 1 dated Apr. 26, 2016.
German Patent Office, German Office Action for German Patent Application No. 10 2011 107 251.2 dated Jun. 24, 2014.
International Searching Authority, International Search Report for Application No. PCT/US2012/002986 dated Nov. 14, 2012.
International Searching Authority, International Preliminary Report on Patentability for Application No. PCT/US2012/002986 dated Jan. 23, 2014.
International Searching Authority, Written Opinion for Application No. PCT/US2012/002986 dated Jan. 23, 2014.

* cited by examiner

WINGTIP DEVICE OF A WING, AND ALSO A WING WITH SUCH A WINGTIP DEVICE

CROSS REFERENCE TO RELATED APPLICATIONS

This present disclosure is a U.S. National Stage entry under 35 U.S.C. § 371 based on International Application No. PCT/EP2012/002986, filed Jul. 16, 2012 which was published under PCT Article 21(2) and which claims priority to German Patent Application No. DE 10 2011 107 251.2 and U.S. Provisional Application No. 61/507,689, both filed on Jul. 14, 2011, which are all incorporated herein in their entirety by reference.

TECHNICAL FIELD

The technical field concerns a wingtip device of a wing, and also a wing with such a wingtip device.

BACKGROUND

From WO 08-061739 A a wing with a wingtip device is of known art. In general the gradient of drag reduction with increasing wing loads reduces with increasing height of the wingtip device, so that increasing the height of the wingtip device is not effective.

In addition, other objects, desirable features and characteristics will become apparent from the subsequent summary and detailed description, and the appended claims, taken in conjunction with the accompanying drawings and this background.

SUMMARY

The present disclosure provides a wingtip device, and also a wing with such a wingtip device, with which the gradient of drag reduction with increasing wing loads can be configured in a particularly favorable manner.

The inventive wingtip device can in general be attached to a wing, or to a wing-like component of an aircraft. The wing-like component, which in what follows is abbreviated to "wing", can be a wing, a tailplane, a stabilizer, or also a canard, wherein the sweep of the wing can be positive or negative. By means of the inventive solution of a wingtip device attached to a wing, or a main winglet with at least two ancillary wing sections, or ancillary wing parts, or ancillary winglets, or auxiliary winglets arranged on the wing, the aerodynamic drag of the overall wingtip device during flight operations can be reduced, and/or the loads acting on the overall wingtip device can be reduced compared with wingtip devices of known art. The inventive wingtip device can reduce the loads that occur under flight conditions that are relevant for the structural design of the wing. The length of an ancillary wing section is thereby clearly less than the length of the wingtip device, and in particular is less by a half. By this means, with matching and optimization of the number and/or size and/or position and/or location of the at least two ancillary wing sections on the wingtip device, it is possible to achieve a gradient of drag reduction that is greater than the gradient of the increasing loads on the wing or wingtip device as a result of aerodynamic loading.

A wing with an inventive wingtip device, i.e. the inventive wingtip device, can be optimized by matching and optimization of the number and/or size and/or position and/or location of the at least two ancillary wing sections on the wingtip device, wherein in particular a reduction of the total drag at a given wing loading and/or a reduction of the wingtip device loading and/or wing loading as a result of external aerodynamic loads can be achieved without any particular effect on the total drag of the wing wingtip device and can be adjusted in a targeted and advantageous manner. In this regard the following can in particular be achieved:

A reduction of the loading and/or load distribution on the wingtip device and/or on the wing ensuing as a result of aerodynamic loads; and/or a reduction of the drag of the wingtip device and/or of the wing during flight operations, or by means of the inventive solution, an advantageous compromise between reduction of the drag of the overall wingtip device and the effect of the loads.

In accordance with one exemplary embodiment the ancillary wing sections in form, size, location and position are provided on the wingtip device such that the ancillary wing sections on a wingtip device compared with a wingtip device without ancillary wing sections exert only a relatively small influence on the drag during flight operations, but exert a considerable influence on the global load distribution over the whole wing, to which the wingtip device is attached.

The inventive solution is in particular advantageous if it is applied to wings with a relatively low stiffness, since then the influence of the inventively provided ancillary wing sections on the global load distribution is particularly advantageous. By virtue of the development of further aerodynamic loads as a function of the configuration and position of the respective ancillary wing sections, the ancillary wing sections contribute to the load redistribution on the wing.

In particular, the difference in wing flexing between the case of steady-state cruise flight that is of interest in terms of drag, and the increased flexing that occurs during flight maneuvers that are of interest for dimensioning the structure, is exploited by means of the inventive solution. By means of the inventive ancillary wing sections it is possible to adjust the local loadings and load distribution on the wing in these flight conditions such that the maximum loads occurring on the wing are reduced and the wing can therefore be built with a lower weight.

In accordance with one aspect of the present disclosure, a wingtip device is provided for a wing that has an inner end and an outer end and in which the local dihedral angle of the wingtip device increases or reduces from the inner end to the outer end, with a pressure-side flow surface and a suction-side flow surface with reference to an assumed prime incident flow direction. In accordance with the various teachings of the present disclosure, provision is made that at least two ancillary wing sections are arranged on the wingtip device, projecting away from the flow surface of the wingtip device. The ancillary wing sections are thereby configured and arranged on the wingtip device such that in a predetermined manner these generate loads acting on the wingtip device, and thus also on the wing to which the wingtip device is attached.

In accordance with one form of embodiment of the present disclosure, at least one ancillary wing section is, or two of the ancillary wing sections are, arranged on the wingtip device such that the attachment region of the ancillary wing section to the wingtip device, i.e. the interface between ancillary wing section and the wingtip device, is predominantly located on the respective flow surface pointing in the local thickness direction of the wingtip device, which in what follows can also be called the suction surface, or is located on the flow surface pointing away from the local thickness direction of the wingtip device, which in what follows can also be called the pressure surface.

In particular provision is thereby made that, with reference to a section through the wingtip device in the YZ-plane, at least one ancillary wing section is arranged on that side of the wingtip device that in general has convex curvature. This form of embodiment is in particular advantageous for aerodynamic reasons, since the span of the wing is increased, and by this means the induced drag can be reduced. In particular the wingtip device can be configured such that the local dihedral angle of the wingtip device continuously increases or reduces from the inner end to the outer end. Alternatively provision can also be made that, e.g. in some sections in the longitudinal direction the wingtip device has a planar profile.

In accordance with one inventive form of embodiment of the wingtip device provision can in particular be made:

That at least two ancillary wing sections are arranged on the wingtip device, in each case projecting away from the flow surface of the wingtip device, and that the ancillary wing sections in each case form an interface with the surface of the wingtip device; these interfaces are located spaced apart from one another.

In accordance with one inventive form of embodiment of the wingtip device provision is made that the separation distance between each pair of interfaces is at least 1.5 times the length of the shorter of the two ancillary wing sections.

In particular provision can be made that in the arrangement of an ancillary wing section one of the ancillary wing sections is arranged on the outer side that in general has convex curvature, i.e. has convex curvature in overall terms from the first end to the second end, with possible deviation in some intermediate sections. Thus in particular provision can be made that, with reference to a section through the wingtip device in the YZ-plane, at least one ancillary wing section is arranged on that side of the wingtip device that in general has convex curvature. In accordance with one advantageous form of embodiment of the present disclosure provision is made that a further ancillary wing section is arranged on the outer side of the wingtip device that in general is convex.

In accordance with one inventive form of embodiment of the wingtip device provision can be made that the ancillary wing section extends along the thickness direction of the local wingtip device coordinates system.

In accordance with a further inventive form of embodiment of the wingtip device provision can be made that the central plane of the ancillary wing section is inclined at an angle of less than 30 degrees with respect to the local thickness direction of the local wingtip device coordinates system.

In accordance with a further inventive form of embodiment of the wingtip device provision can be made that the in particular inventively defined local central plane of the ancillary wing section is inclined at an angle of less than 30 degrees relative to the local thickness direction of the local wingtip device coordinates system, at least within a region of up to 85% of the length of the ancillary wing section.

Also in accordance with an inventive form of embodiment of the wingtip device provision can be made that the area of the surface of one side of the ancillary wing section is less than 30% of the area of the surface, or, in particular, of the inventively defined central plane, of the wingtip device. Alternatively or additionally provision can be made that the area of the surface of the ancillary wing section is greater than 5% of the area of the surface of the wingtip device, or of the central plane of the wingtip device.

In accordance with a further inventive form of embodiment of the wingtip device provision is made that the length of the ancillary wing section at right-angles to the respective point on the surface of the wingtip device or the main wing is less than 5% of the half-span of the wing.

Also in accordance with an inventive form of embodiment of the wingtip device provision is made that the length of the ancillary wing section at right-angles to the respective point on the surface of the wingtip device or the main wing is a minimum of 1.0% of the half-span of the wing.

In accordance with a further inventive form of embodiment of the wingtip device provision is made that the thickness of the ancillary wing section is equal to or less than the local thickness of the wingtip device at the point at which the ancillary wing section is attached.

In accordance with a further inventive form of embodiment of the wingtip device the configuration of the inventive ancillary wing section is provided such that the length between a first end and an outer end of the same is at least twice as large as the maximum chord of the ancillary wing section.

In accordance with a further inventive form of embodiment of the wingtip device provision is made that the taper of the ancillary wing section has a value in the range between 0.3 and 0.8, wherein the taper of the ancillary wing section is defined as the local wing chord at 10% of the total length of the ancillary wing section, as viewed from its inner end, relative to the local wing chord at 85% of the total length of the ancillary wing section, as viewed from its inner end.

In accordance with a further inventive form of embodiment of the wingtip device provision is made that the relative thickness of the ancillary wing section is between 6% and 15%, wherein in particular the relative thickness is defined as the maximum thickness occurring overall in the ancillary wing section, relative to the related profile chord of the ancillary wing section at the same cross-sectional area in which the maximum thickness occurs. The profile chord is thereby defined as the greatest breadth of a respective cross-sectional area q of the ancillary wing section, and the thickness is defined as the greatest local thickness, or height at right-angles to the line of the profile chord, ensuing in the same cross-sectional area q of the ancillary wing section, i.e. the greatest separation distance occurring in the respective cross-sectional area q between profile outer surfaces, or profile lines, located opposite to one another. The maximum thickness of an ancillary wing section is thereby the greatest local thickness or height occurring overall in the cross-sectional areas q.

In accordance with an alternative inventive definition of the profile chord of the ancillary wing section, this is the length of a straight line between two points on the boundary curve of the cross-sectional area q of the ancillary wing section, wherein the two points on the boundary curve are arranged in such a manner that their separation distance is a maximum in comparison to any other possible positioning of the points on the boundary curve of the plane q. The chordwise direction of the cross-sectional area q runs along this line. The maximum thickness is defined as the maximum separation distance of the boundary curve of the cross-sectional area, measured at right-angles to the chordwise direction of the same cross-sectional area.

In accordance with a further inventive form of embodiment of the wingtip device provision is made that the configuration of the ancillary wing section is such that the chord of the ancillary wing section at its first end, relative to the chord of the wingtip device in the chordwise direction of the local wingtip device coordinates system, lies in the range between 20% and 80%, wherein the chord of the wingtip device is that chord of the wingtip device at that point at which the thickness direction of the local wingtip device coordinates system passes through the first end of the ancillary wing section.

In accordance with a further aspect of the present disclosure, a wing is provided with a wingtip device in accordance with the various teachings of the present disclosure.

In accordance with an inventive form of embodiment of the wing at least one inventively configured ancillary wing section is additionally arranged on the main wing.

Provision can in particular be made that the configuration of the inventive ancillary wing section arranged on the main wing in this form of embodiment is such that the length between a first end and an outer end of the ancillary wing section is at least twice as large as the greatest chord of the ancillary wing section.

The wingtip device can thereby be configured such that the taper of the ancillary wing section has a value in the range between 0.3 and 0.8, wherein the taper of the ancillary wing section is defined as the local wing chord at 10% of the total length of the ancillary wing section, as viewed from its inner end, relative to the local wing chord at 85% of the total length of the ancillary wing section, as viewed from its inner end.

Alternatively or additionally the wingtip device can thereby in particular be configured such that the relative thickness of the ancillary wing section is between 6% and 15%, wherein the relative thickness is defined as the maximum thickness of the ancillary wing section overall, relative to the profile chord of the ancillary wing section, wherein the profile chord is defined as the greatest breadth of the respective cross-sectional area q of the ancillary wing section, and the maximum thickness is defined as the greatest height at right-angles to the profile chord in the same cross-sectional area q of the ancillary wing section.

Furthermore, alternatively or additionally, the wingtip device can thereby in particular be configured such that the chordwise extent of the ancillary wing section at its first end relative to the chordwise extent of the wingtip device in the chordwise direction of the local wingtip device coordinates system lies in the range between 20% and 80%, wherein the chordwise extent of the wingtip device is that chordwise extent of the wingtip device at that point at which the thickness direction of the local wingtip device coordinates system passes through the first end of the ancillary wing section.

In accordance with an inventive form of embodiment of the wingtip device provision is made that the separation distance between each pair of interfaces is at least 1.5 times the length of the shorter of the two ancillary wing sections.

In accordance with a further aspect of the invention a wing is also provided with a wingtip device in accordance with an inventive form of embodiment.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
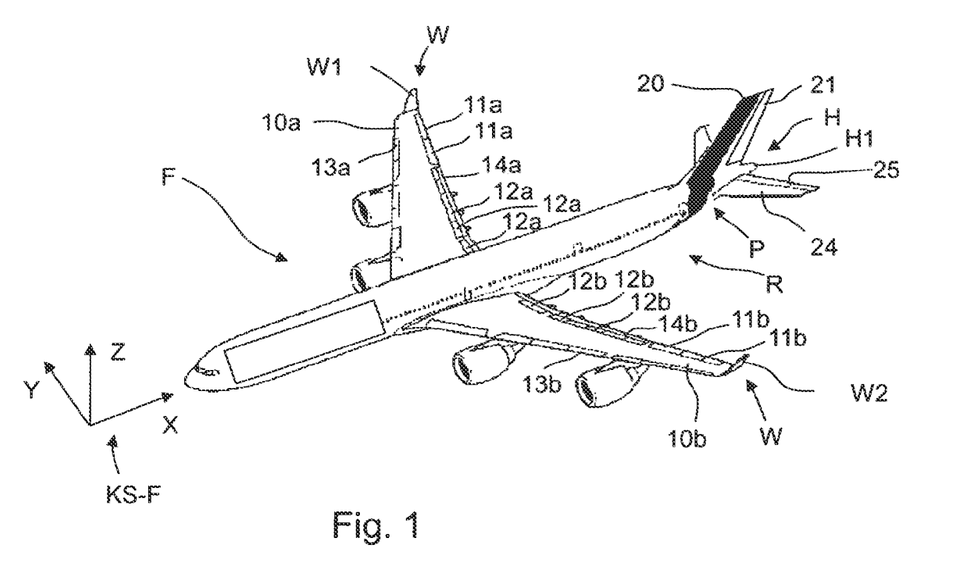
FIG. 1 shows a schematic representation in perspective of an aircraft on which the inventive wingtip device can be arranged.

FIG. 1 shows an exemplary embodiment of an aircraft F with two wings 10a, 10b, on each of which is arranged an inventive wingtip device W. In FIG. 1 is registered an aircraft coordinates system KS-F relating to the aircraft F, with an aircraft longitudinal axis X, an aircraft transverse axis Y and an aircraft vertical axis Z. Therein the left-hand wingtip device, as viewed in the longitudinal direction X, is designated with the reference symbol W1, and the right-hand wingtip device, as viewed in the longitudinal direction X, is designated with the reference symbol W2. The wings 10a, 10b in each case have at least one aileron, 11a and 11b respectively. The wings 10a, 10b can optionally have in each case a number of spoilers 12a and 12b respectively, leading edge slats 13a, 13b, and/or trailing edge flaps 14a, 14b. In FIG. 1 only some of the spoilers 12a and 12b respectively, leading edge slats 13a, 13b, and/or trailing edge flaps 14a, 14b are provided with a reference symbol. Furthermore the aircraft F has a vertical tail unit 20 with at least one rudder 21. The aircraft F can optionally also have a tailplane unit 24, in each case with at least one elevator 25. The tailplane 24 can also be designed as a T-tail unit or a cruciform tail unit.

The inventive aircraft F can also have a shape other than that of the aircraft F represented in FIG. 1. For example, the inventive aircraft can also take the form of a high wing aircraft or a flying wing. The aircraft can also be an aircraft that has canards instead of a tailplane. The wing can, for example, have positive or negative sweep.

In the description of the shape of the wingtip device W in accordance with the present disclosure reference is made to a local coordinates system KS-W for the wingtip device W, which is locally formed at points on the profile of the longitudinal direction L of the wingtip device W. The local coordinates system KS-W for the wingtip device W has, as axes, the local wingtip device spanwise direction S-W, the local wingtip device thickness direction D- and the local wingtip device chordwise direction T-W, which runs parallel to the longitudinal axis X of the aircraft coordinates system KS-F. The orientation of these axes and the origin of the local coordinates system KS-W for the wingtip device W can in particular furthermore be defined on the basis of the smallest cross-sectional area of the wingtip device W ensuing in each case at each point of the wingtip device W, wherein the origin of the local coordinates system KS-W is the centroid of the plane ensuing for the respective cross-sectional area and located in the latter, and the local wingtip device thickness direction WD and the local wingtip device chordwise direction WT are located in what is, in each case, the smallest cross-sectional area.

Figure 2:
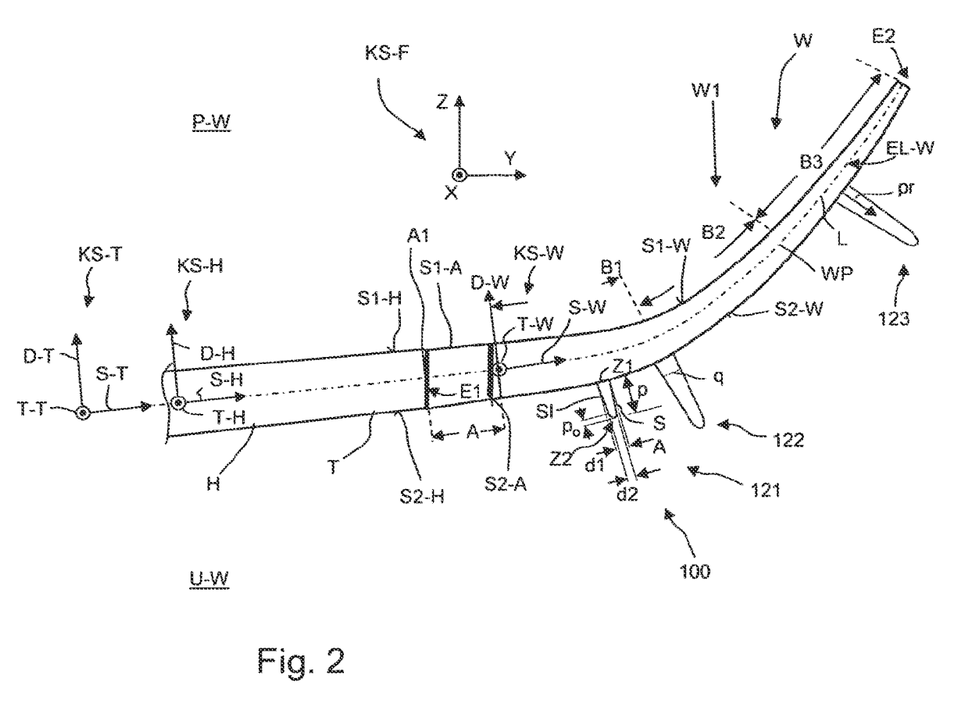
FIG. 2 shows a schematic view of an outer region of an exemplary embodiment of the inventive wing with a wingtip device and ancillary wing sections in accordance with the various teachings of the present disclosure, wherein the view shows the left-hand wing of the aircraft, as viewed in the longitudinal direction of the aircraft, and is generated on the basis of a direction of view that is opposed to the longitudinal direction of the aircraft.
Figure 3:
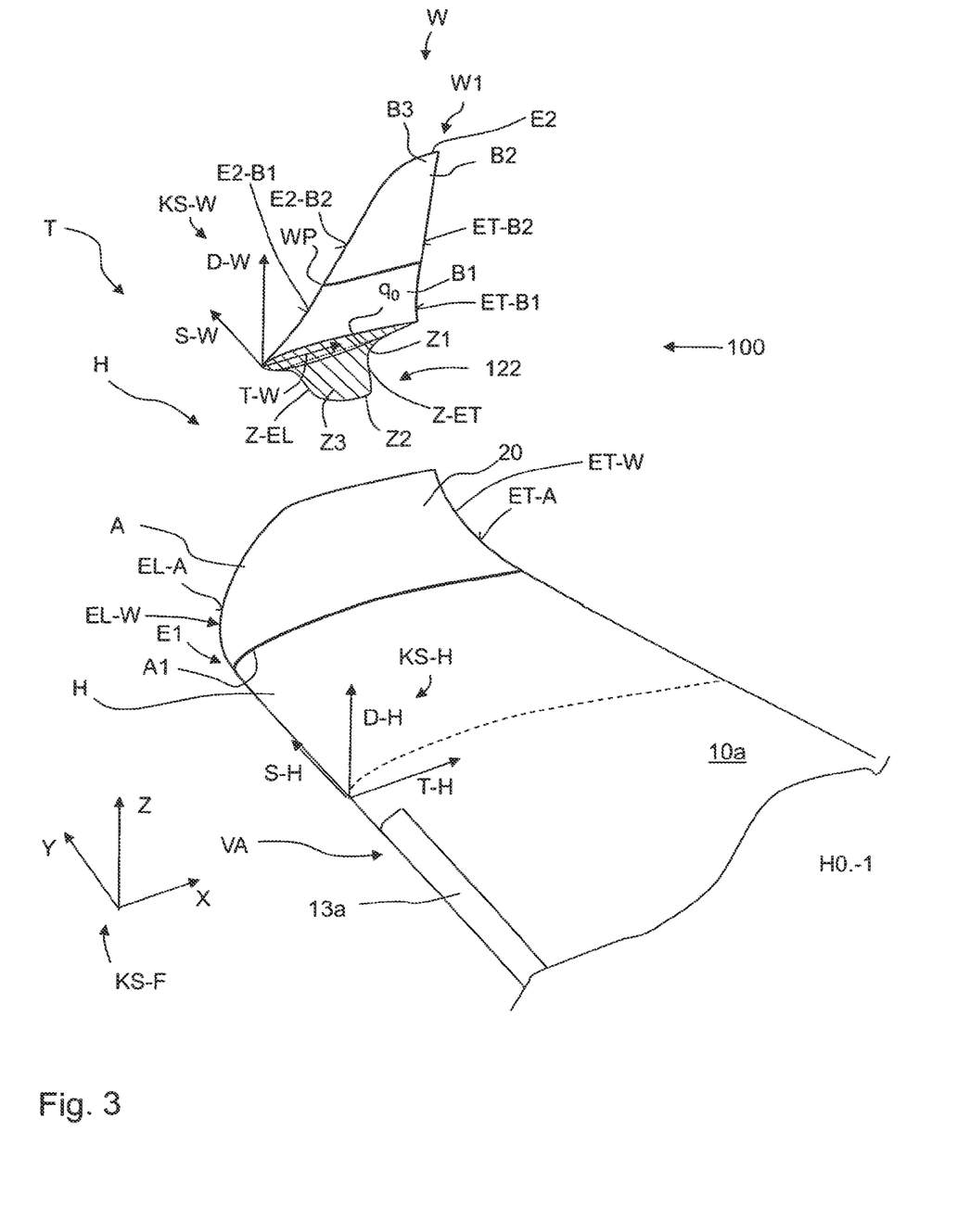
FIG. 3 shows a representation in perspective of the exemplary embodiment of the inventive wing from FIG. 2 with a wingtip device in which an outer section of the wingtip device, for purposes of illustration, is represented in perspective detached and displaced from the remainder of the wing, wherein an ancillary wing section can be seen arranged on the wingtip device in accordance with the present disclosure.
Figure 4:
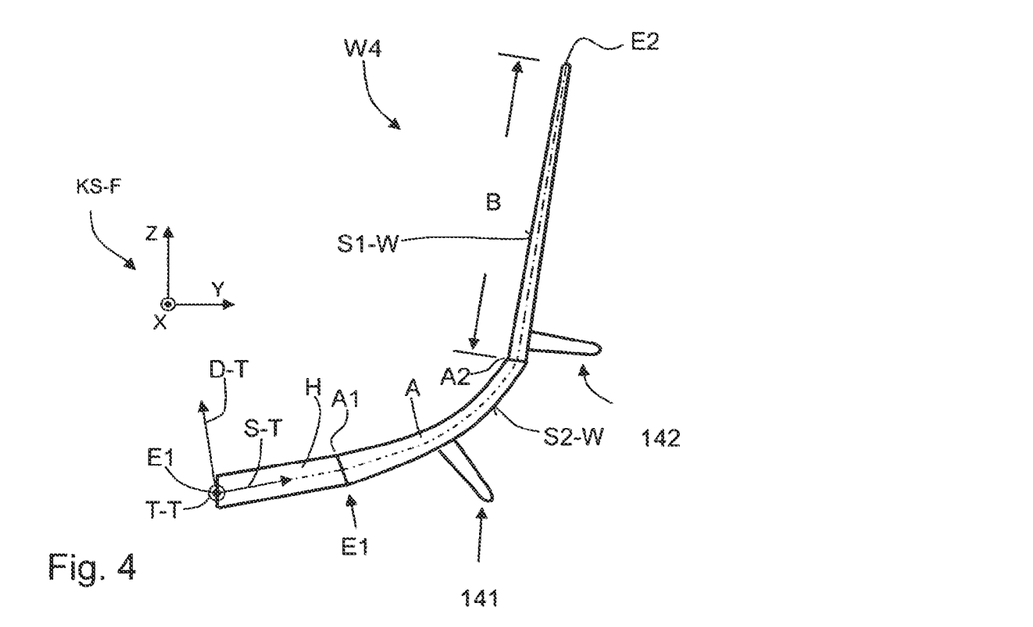
FIG. 4 shows a schematic view, generated on the basis of a direction of view that is opposed to the longitudinal axis of the aircraft, of a further exemplary embodiment of the inventive wing with a wingtip device and two ancillary wing sections, each arranged on the lower side of the wingtip device in accordance with the present disclosure.

FIGS. 2 and 3 show an exemplary embodiment of the inventive wingtip device, i.e. of the wing with such a wingtip device. In these FIGS. 2 and 3 is represented a wingtip device W for the left-hand wing, as viewed in the direction of the longitudinal axis X of the aircraft. In FIGS. 3 and 4 are registered both the aircraft coordinates system KS-F and the local coordinates system KS-H of the main wing H, on which the wingtip device W, or W1 to W4, is arranged; the local coordinates system KS-H, as viewed from the wing root to the start of the wingtip device W, is identical with the wing coordinates system KS-T with the wing spanwise direction S-T, the wing chordwise direction T-T and the wing thickness direction D-T.

The coordinates system KS-H of the main wing H and thus of the wing T is a local coordinates system, and is formed from a main wing spanwise direction S-H, a main wing chordwise direction T-H, and a main wing thickness direction D-H, in each case of the main wing. Furthermore the coordinates system KS-W of the wingtip device W is a local coordinates system, and is formed from a wingtip device spanwise direction S-W, a wingtip device thickness direction D-W and a wingtip device chordwise direction T-W, in each case of the wingtip device W. Since this main wing coordinates system KS-H is fundamentally defined in a similar manner to the wingtip device coordinates system KS-W and the wing coordinates system KS-T, geometrical parameters and reference quantities could also be described in terms of a wing coordinates system. In accordance with an inventive definition the local coordinates system KS-H for the main wing H is oriented such that the local wing chordwise direction T-H runs parallel to the longitudinal axis X of the aircraft coordinates system KS-F. In particular the orientation of the axes and the origin of the local system of coordinates KS-T for the wing T can furthermore be defined on the basis of the smallest cross-sectional area of the wing T ensuing in each case at each point of the wing T, wherein the origin of the local coordinates system KS-T is the centroid of the plane ensuing for the respective cross-sectional area and located in the latter, and the local wing thickness direction D-H and the local wing chordwise direction F-H are located in what is, in each case, the smallest cross-sectional area.

In accordance with an alternative inventive definition the local coordinates system KS-H for the wing T is oriented such that the wing chordwise direction T-H of the coordinates system KS-H of the main wing H runs in the X-direction or longitudinal direction of the aircraft coordinates system KS-F, and such that the wing thickness direction D-H of the coordinates system KS-H of the main wing H runs in the Z-direction of the aircraft coordinates system KS-F, or the direction of the vertical axis Z of the aircraft F.

The wingtip device W is directly attached to the main wing H. Surfaces or lines of the main wing H and the wingtip device W that are located adjacent to one another can thereby form an edge line, i.e. a kink.

The wingtip device W, with reference to the spanwise direction S-H of the main wing H, on which the wingtip device W is arranged, has an inner end E1 for purposes of forming a wingtip device attachment, and an outer end E2, forming the wingtip, and lengthens the main wing H, i.e. the wing T, in its spanwise direction S-H or S-T, starting from the outermost end of the main wing H, to which the wingtip device W is attached. The wingtip device W has a wingtip device trailing edge ET-W, a wingtip device leading-edge EL-W, a wingtip device upper side S-W and a wingtip device lower side P-W, which in each case proceed between the first end E1 and the second end E2.

The wingtip device W can also have an attachment region or transition region A, with which the wingtip device W is attached to the main wing H. A first surface S1-W of the wingtip device W, with the first surface or upper side S1-A of the transition region A, is thereby attached to the first surface or suction surface S1-H of the main wing H, and a second surface S2-W of the wingtip device W, with the second surface or lower side S2-A of the transition region A, is attached to the second surface or pressure surface S2-H of the main wing H. In this case surfaces or lines that are located adjacent to one another can form an edge line, i.e. a kink, in an attachment region A attached to the wing T and attached to the wingtip device W, or within the attachment region A. The first surface S1-W of the wingtip device W and the first surface S1-H of the main wing H form a first or upper side S1-T of the wing T and the second surface S2-W of the wingtip device W and the second surface S2-H of the main wing H form a second or lower side S2-T of the wing T.

In the forms of embodiment of the wingtip device W in accordance with the exemplary embodiment of a wing T with an inventive wingtip device W represented in FIGS. 2 and 3, the wingtip device W has an attachment region or transition region A, which is configured such that the transition region A and also the transition between the main wing H and the transition region A and the wingtip device W, also its trailing edge ET-W and/or its leading edge EL-W and/or profile lines of the first side S1-W of the wingtip device W proceeding along the spanwise direction S-W, and/or profile lines of the second side S2-W of the wingtip device W proceeding along the spanwise direction S-W, can in each case proceed with a continuous tangent, i.e. can be formed without a kink. "Continuous tangent" means that these lines have profiles with a shape of curve that can be differentiated mathematically, in which, as explained above, the tangents to the surfaces of the main wing H or wing T, and the wingtip device W, proceeding in opposite directions that are in each case oriented along the spanwise direction, encounter one another at the transition point without any discontinuity in angle. Here the expression "along" a direction, which here is the spanwise direction, should in this context be understood to mean along a direction with a maximum of 45 degrees deviation from this direction, i.e. from the spanwise direction.

The wingtip device W can also be formed at its trailing edge ET-W, and/or at its leading edge EL-W, and/or on profile lines of the first side S1-W of the wingtip device W proceeding along the spanwise direction S-W, and/or on profile lines of the second side S2-W of the wingtip device W proceeding along the spanwise direction S-W, which in each case have continuous curvature i.e. they can be mathematically differentiated twice.

The transition from the surface of the main wing H to the transition region A, that is to say, at this point, the trailing edge ET-T, and/or the leading edge EL-T, and/or the profile lines of the first side S1-T proceeding along the spanwise direction S-W, and/or the profile lines of the second side S2-T proceeding along the spanwise direction S-W can also be formed with a continuous tangent or a continuous curvature.

In accordance with a further exemplary embodiment provision is made that the attachment region or transition region A and/or the wingtip device W and/or the transition between the wing T and the wingtip device W, and in particular at this point or the respective region the trailing edge ET-T or ET-W, the leading-edge EL-T or EL-W, the first side S1-T or S1-W and/or the second side S2-T or S2-W has an edge line or a corner, so that these points are not part of a kink-free and curve-shaped section, since at these transition points the respective tangents of the wing T and the wingtip device R encounter each other in different directions and with a discontinuity in angle, if the tangents directed along the spanwise direction, in each case ensuing from directions proceeding opposite to one another, are thereby considered.

In general an inventive definition of the local wingtip device coordinates system KS-W is likewise to be applied for the description of the transition region A, inasmuch as the latter is provided in a form of embodiment of the inventive wing.

In accordance with a further exemplary embodiment of the inventive wingtip device provision is made that the wing T does not have a transition region A and that thereby the transition from the surface of the main wing H to the wingtip device W is formed with a continuous tangent (i.e. can be differentiated at least once) or with a continuous curvature. The main wing H and in particular its local longitudinal direction L, as viewed from the main wing root, proceeds in a planar manner, and in particular with a constant dihedral, or in a linear manner, from the main wing root to the start of the transition region A. In particular the reference line formed from the longitudinal directions in the region of the main wing H is configured with a continuous curvature. A main wing is then accepted as linear if the deviation of the dihedral along the longitudinal direction L, measured over a breadth of 20% of the span of the main wing at any position of the main wing H along the longitudinal direction L, is less than a degree. In accordance with one form of embodiment the wingtip device is arranged in a spanwise region from 80 to 100% with reference to the half-span, wherein 0% is the central axis of the fuselage. The spanwise extent corresponds to the y-direction of the coordinates system KS-F. In accordance with one form of embodiment the reference line and/or the first side S1 and the second side S2 at the point A1 does not have a continuous curvature, and has only a continuous tangent, or a kink.

For the inventively provided wingtip device W, which in FIGS. 4, 5, 6, 7 and 8 is designated with the reference symbols W4, W5, W6, W7 and W8 respectively, in what follows only the designation W is used, insofar as reference is not specifically made to a form of embodiment of the wingtip device represented in a particular figure. For the inventively provided wingtip device W provision can in particular be made that the local dihedral angle of the wingtip device W non-continuously or continuously increases or reduces from the inner end E1 to the outer end E2, that is to say, in the longitudinal direction L of the wingtip device W. In the case of increasing dihedral angle in the longitudinal direction L of the wingtip device W the wingtip device W or its second end E2, is directed upwards, while in the case of decreasing dihedral angle in the longitudinal direction L of the wingtip device W the wingtip device W or its second end E2, is directed downwards. In particular the increase or decrease of the dihedral angle along the spanwise direction S-W can be constant, i.e. sections can, for example, be present that extend in the spanwise direction S—with no curvature. In this context the curvature is understood to be the curvature of the central plane of the wingtip device W, and/or of the first side or flow surface S1-W, and/or of the second side or flow surface S2-W.

"Upwards" is thereby to be understood as, starting from the wing T, that direction that is directed away from the upper side S-T of the wing T, or the positive Z-direction of the aircraft coordinates system KS-F, or the positive wing thickness direction of the wing coordinates system KS-T.

In accordance with the present disclosure, the longitudinal direction L can, in particular, be identical with the reference line as cited. The longitudinal direction L can thereby be the line connecting the centroids of those surfaces with the smallest cross-sectional areas, in which are respectively located the local wingtip device thickness direction WD, and the local wingtip device chordwise direction WT, i.e. the local wing thickness direction FD, and the local wing chordwise direction FT.

In accordance with one embodiment of the present disclosure at least two ancillary wing sections 100 are arranged on the wingtip device W, which in each case extend outwards along the thickness direction D-W of the wingtip device W from the wingtip device W. In accordance with one embodiment of the present disclosure the at least two ancillary wing sections 100 are located with reference to a section through the wingtip device in the YZ-plane on that side of the wingtip device W that in overall terms has convex curvature. Under "in overall terms convex" should hereby be understood to mean that some non-convex sections are permitted. In particular it is hereunder understood that the local dihedral at the first end E1 of the wingtip device W is less than at the second end E2 of the wingtip device W. In particular the at least two ancillary wing sections W are spaced apart from one another in the wingtip device spanwise direction S-W.

In general the inventively provided ancillary wing section 100 can in each case be configured such that this has a lens-shaped, drop-shaped or wing profile-type cross-sectional profile. In accordance with an inventive definition the cross-sectional area q determining the cross-sectional profile (in FIG. 2 registered as a dotted line) can thereby be that cross-sectional area of the ancillary wing section 100, which is located in the plane defined by the spanwise direction S-W and the chordwise direction T-W of the local wingtip device coordinates system KS-W.

In accordance with the present disclosure the direction of the greatest breadth of the respective cross-sectional area q of the ancillary wing section 100 can be defined as the chordwise direction of the ancillary wing section 100. Thus the ancillary wing section 100 in general, depending on the configuration of the ancillary wing section 100, has a local chordwise direction that alters along the longitudinal direction as a function of the position of the longitudinal direction.

In accordance with one embodiment of the present disclosure an arrangement of ancillary wing sections 100 is provided, wherein the distance separating adjacent ancillary wing sections 100 from one another is in each case at least five times the thickness d1 of the respectively smallest ancillary wing section 100 on the respective wingtip device W. Provision can thereby be made that the distance separating adjacent ancillary wing sections 100, i.e. ancillary wing sections 100 that have least distance from one another, is in each case at most double the height of the highest ancillary wing section of the ancillary wing sections arranged on the respective wingtip device.

The various embodiments of a wingtip device W represented in FIGS. 2 to 8 in accordance with the present disclosure, show this in each case as a wingtip device W, that is curved "in overall terms upwards", that is to say, in its profile of the positive wingtip device spanwise direction S-W, i.e. from the inside to the outside, is curved in the direction of the positive wingtip device thickness direction D-W. That is to say, in overall terms the wingtip device W has a positive dihedral. In FIGS. 2 to 8 the second side S2 of the wingtip device W has a convex profile in overall terms.

In the exemplary embodiment represented in FIG. 2 three ancillary sections 121, 122, 123 are arranged on the lower flow surface U-W with reference to the aircraft vertical axis Z. FIG. 3 shows a representation in perspective of the exemplary embodiment of the inventive wingtip device W and wing T in accordance with FIG. 2, with the wingtip device W2, in which for purposes of illustration the outer sections B1 and B2 of the wingtip device are represented in perspective detached and displaced from the remainder, that is to say, from the transition region A. The sectional plane of this representation proceeds in the wingtip device spanwise direction S-W directly through the central ancillary wing section 122, so that the ancillary wing section 122 represented in this figure is designated as a sectional representation. The sectional line is thereby located such that the central plane Z3 of the ancillary wing section 122 is visible in FIG. 3.

As described in terms of the ancillary wing section 121, the ancillary wing section 100 has, as viewed in the thickness direction D-W of the wingtip device W, a first or inner end Z1 and a second or outer end Z2 located opposed to this, and also—in each case with reference to the aircraft longitudinal direction X—a leading edge line Z-EL and a trailing edge line Z-ET. Furthermore the ancillary wing section 100 has in general a length p, which is the separation distance between the root or the first end Z1 and the second end Z2, an inner surface SI facing towards the root of the main wing H and an outer surface SA directed in an opposite direction to the latter. The thickness on the first end Z1 as viewed in the YZ-plane is designated with the reference symbol d1. Furthermore a length p0 is registered in FIG. 2, over which extends the edge line ensuing in the plane defined by the axes S-W and D-W, which defines the shape of the edge section located at the second end Z2.

In addition to the local cross-sectional areas q, which lie in the plane defined by the spanwise direction S-W and the chordwise direction T-W of the local wingtip device coordinates system KS-W, a plane interface region q0 is also defined for the representation of the present disclosure, which geometrically is the area bordered by the contour line of the respective ancillary wing section 100, which defines the contour surface of the ancillary wing section 100 in its attachment to the surface of the wingtip device W. This contour line, i.e. this interface region q0, thus ensues from the intersection obtained by cutting through the wingtip device W and the ancillary wing section 100. The interface region q0 does not necessarily lie in the plane defined by the spanwise direction S-W and the chordwise direction T-W of the local wingtip device coordinates system KS-W. In accordance with the present disclosure the first or inner end Z1 is defined as the geometric centroid of the interface region q0. For purposes of defining the local wingtip device coordinates system KS-W that is applicable to the local cross-sectional areas q, the system is selected such that its origin is located in the first end Z1. The second or outer end Z2 is, as viewed from the first end Z1, the outermost point of the ancillary wing section 100 in the thickness direction D-W of the local wingtip device coordinates system KS-W.

For the local cross-sectional areas q, which lie in the plane defined by the spanwise direction S-W and the chordwise direction T-W of the local wingtip device coordinates system KS-W, a geometric centroid is defined in each case. In accordance with a definition of the present disclosure the line connecting all these centroids results in a central line p starting from the first end Z1, the length of which, in accordance with the present disclosure, is the length of the respective ancillary wing section 100. The central line p can thus be straight or curved, depending on the shape of the ancillary wing section 100.

In accordance with the present disclosure the direction of the greatest breadth of the respective cross-sectional area q of the ancillary wing section 100 can be defined as the chordwise direction of the ancillary wing section 100. Thus the ancillary wing section 100, depending on the configuration of the ancillary wing section 100, has in general a local chordwise direction has a local chordwise direction that alters along the longitudinal direction pr of the ancillary wing section 100 as a function of the position of the longitudinal direction. The local chordwise direction of the ancillary wing section 100 can in accordance with the present disclosure be determined under the additional condition.

The thickness d1 is that thickness of the ancillary wing section 100, which ensues in the thickness direction at right-angles to the local chordwise direction and located in the respective local cross-sectional area q. In general, therefore, the magnitude of the thickness d1 is dependent on the local position on the central line p.

Moreover a thickness can be defined in overall terms for the ancillary wing section 100. The magnitude of the thickness d1 of the ancillary wing section 100 in overall terms, or an inventive relative thickness, can be determined in accordance with an inventive definition as the relative thickness of the ancillary wing section 100 in its extent from its first end Z1 to its second end Z2. In accordance with an alternative inventive definition the thickness d1 of the ancillary wing section 100 can be determined in overall terms as the relative thickness of the ancillary wing section 100 in its extent from its first end Z1 to a point at a height h0 below its second end Z2. In accordance with an inventive definition the height h0 can be the magnitude in accordance with 15% of the length of the central line p of the same. The height section or end section with the height h0 can in particular be that region in which essentially the constriction of the cross-sectional profile of the ancillary wing section 100 in accordance with the invention occurs.

In accordance with a further alternative inventive definition of the ancillary wing section 100 the thickness d1 of the ancillary wing section 100 in overall terms, or of an inventive relative thickness, can be determined as the thickness of the ancillary wing section 100 at the foot of the same. In this case the thickness d1 ensues in the thickness direction, which proceeds at right-angles to the chordwise direction of the interface region q0 of the ancillary wing section 100.

In accordance with the present disclosure, provision can be made for the relative thickness to be between 6% and 15%. The relative thickness is thereby defined as the maximum thickness of the ancillary wing section in overall terms, with reference to the profile chord of the ancillary wing section, wherein the profile chord is defined as the greatest breadth of the respective cross-sectional area q of the ancillary wing section, and the maximum thickness is defined as the greatest height at right-angles to the profile chord in the same cross-sectional area q of the ancillary wing section.

In accordance with one embodiment of the wingtip device W at least one thereon arranged ancillary wing section 100 is, and in particular all thereon arranged ancillary wing sections 100 are, oriented on the wingtip device W such that the local central plane of the ancillary wing section is inclined at an angle of less than 30 degrees relative to the local thickness direction D-W of the local wingtip device coordinates system KS-W, at least within a region of up to 85% of the length of the ancillary wing section 100. In this context the local central plane is understood to be that plane, which is defined by the local longitudinal direction pr and the local chordwise direction of the respectively local cross-sectional area q of the ancillary wing section 100. Moreover can in accordance with the present disclosure a central plane of the ancillary wing section 100, in general to be defined in three-dimensions, can be defined as that surface in which the central line of the ancillary wing section 100 and the local chordwise directions of the ancillary wing section 100 are located. The central plane is thereby the surface bounded by the outer contour.

Furthermore provision is made that the area of the surface of one side of the ancillary wing section 100 is less than 30% of the area of the surface, or of the central plane, of the wingtip device W.

In accordance with the present disclosure, the plurality of ancillary wing sections 100 arranged on the wingtip device W, which are located spaced apart from one another, can in each case form an interface q0 with the surface of the wingtip device W.

In accordance with the present disclosure, provision can furthermore be made that the separation distance between each pair of interfaces is at least 1.5 times the length p of the shorter of the two ancillary wing sections 100; 101, 102, 103.

The configuration of the inventive ancillary wing section 100; 101, 102, 103 can in particular be provided such that the length of the same is at least one times as large as the greatest chord of the ancillary wing section 100; 101, 102, 103.

In accordance with the present disclosure, the taper of the inventive ancillary wing section 100 has a value in the range between 0.3 and 0.8. The taper of the ancillary wing section 100 is thereby understood to be the local wing chord at 10% of the total length, as viewed from the first end Z1, relative to the local wing chord at 85% of the total length, as viewed from the first end Z1.

In accordance with the present disclosure, the configuration of the ancillary wing section 100 can be provided such that the chord of the ancillary wing section 100 at its first end Z1, with reference to the chord of the wingtip device W in the chordwise direction T-W of the local wingtip device coordinates system KS-W, lies in the range between 20% and 80%. In this context the chord of the wingtip device W can be understood to be that chord of the wingtip device W at that point at which the thickness direction D-W of the local wingtip device coordinates system KS-W passes through the first end Z1.

The inventive wingtip device W can in particular be embodied such that the leading edge of the same, as viewed from the main wing root, has in the transition region a decreasing sweep angle, in a first section B1 an increasing sweep angle, and in an end section EL-B2 once again a decreasing sweep angle. In one embodiment of the inventive wingtip device W an inventive ancillary wing section is arranged on its convex configured second side in the transition region A, in the first section B1, and in the second section B2 respectively.

In the various embodiments of the inventive wingtip device W of FIGS. 5 to 8 this is formed in each case from a transition region A with a curvilinear profile of the longitudinal direction L in this section A, and, as viewed in the spanwise direction S-W, a section B that in its longitudinal direction L is linear. The transition section A thereby forms a transition from the dihedral of the main wing H, as viewed from the main wing root, at the start of the transition region A, i.e. wingtip device W, to the dihedral angle at the start of the planar end section B. In the forms of embodiment in FIGS. 4 and 5 in the transition section A of the wingtip device W4 and W5 respectively an ancillary wing section 141 and 151 respectively is arranged in each case on the second side S2-W, and an ancillary wing section 142 and 152 respectively is arranged in each case on the second side S2-W. In the embodiment in FIG. 5 an ancillary wing section 153 is additionally arranged on the first side S1-W in the outer section B.

Figure 6:
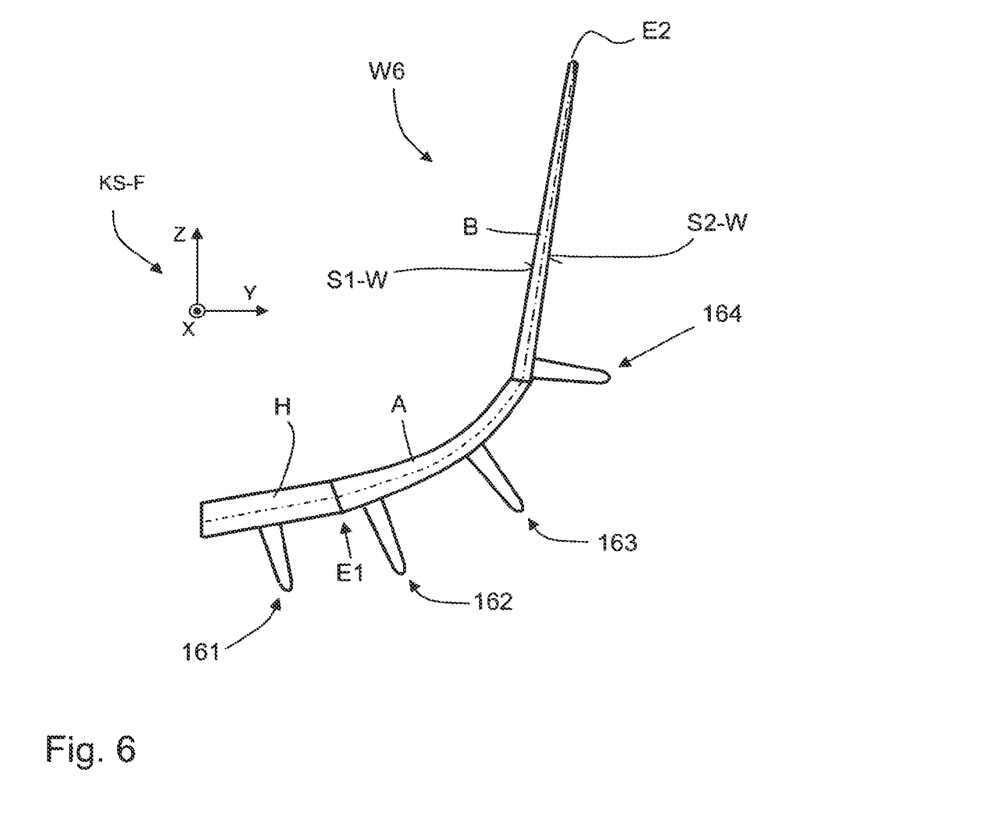
FIG. 6 shows a schematic view, generated on the basis of a direction of view that is opposed to the longitudinal axis of the aircraft, of an outer region of a further exemplary embodiment of the inventive wing with a wingtip device and four ancillary wing sections in accordance with the present disclosure, each arranged on the lower side of the wingtip device.

The embodiment of the wingtip device W6 represented in FIG. 6 in addition has an ancillary wing section 161 on the second side S2-H of the main wing that is planar in form or proceeds in a linear manner.

Figure 5:
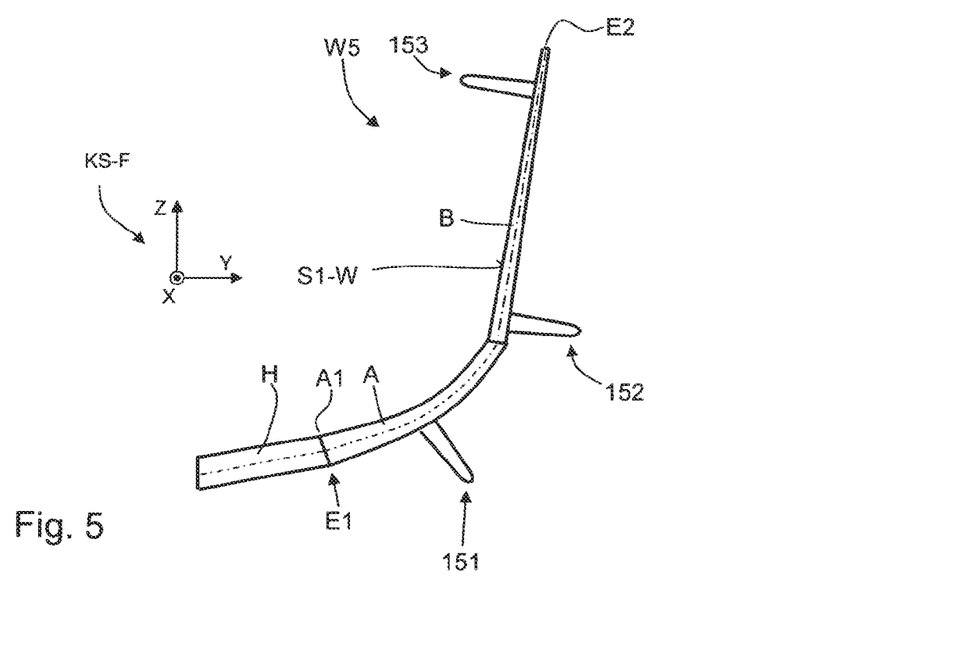
FIG. 5 shows a schematic view, generated on the basis of a direction of view that is opposed to the longitudinal axis of the aircraft, of an outer region of a further exemplary embodiment of the inventive wing with a wingtip device and three ancillary wing sections in accordance with the various teachings of the present disclosure, of which two are arranged on the lower side of the wingtip device, and one is arranged on the upper side of the wingtip device.

In particular, as shown in FIGS. 4 to 6, on account of the planar design of the outer section B a kink can thereby occur on the first side S1-W and the second side S2-W in the transition between the transition region and the outer region B. In particular the reference line L at this position thereby has a kink, i.e. is not formed with a continuous tangent at this position.

Figure 7:
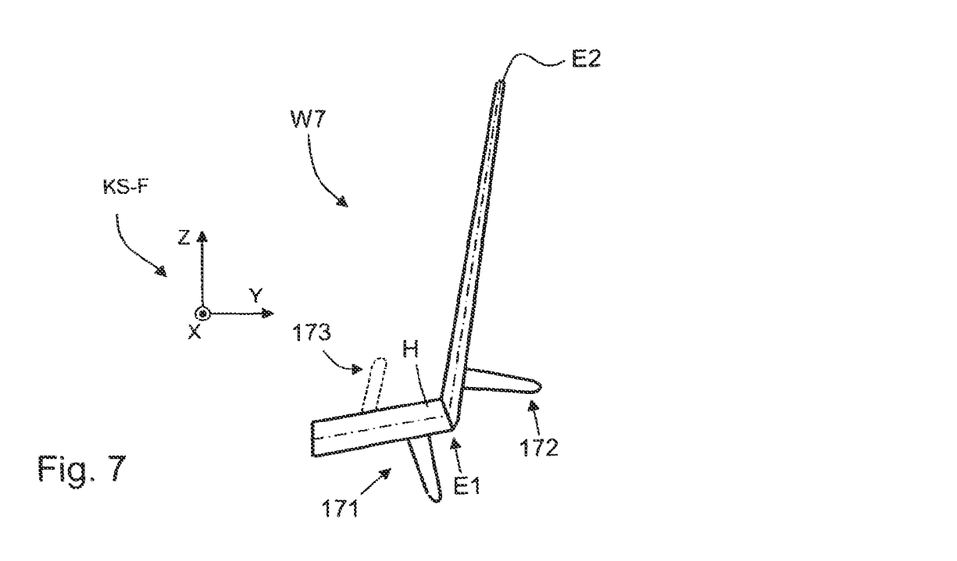
FIG. 7 shows a schematic view, generated on the basis of a direction of view that is opposed to the longitudinal axis of the aircraft, of an outer region of a further exemplary embodiment of the inventive wing with a wingtip device and three ancillary wing sections in accordance with the present disclosure, of which two are arranged on the lower side of the wingtip device, and one is arranged on the upper side of the wingtip device.

The embodiment of the wing represented in FIG. 7 likewise has a predominantly planar wingtip device W7, which is attached to the main wing H with a kink. The wing T thereby has a first ancillary wing section 171 on the lower side S2-T of the wing in the region of the main wing H, a second ancillary wing section 172 on the lower side S2-T of the wing in the region of the wingtip device W7, and a third ancillary wing section 173, represented with dashed contours and optionally provided, on the upper side S1-T of the wing in the region of the main wing H.

Figure 8:
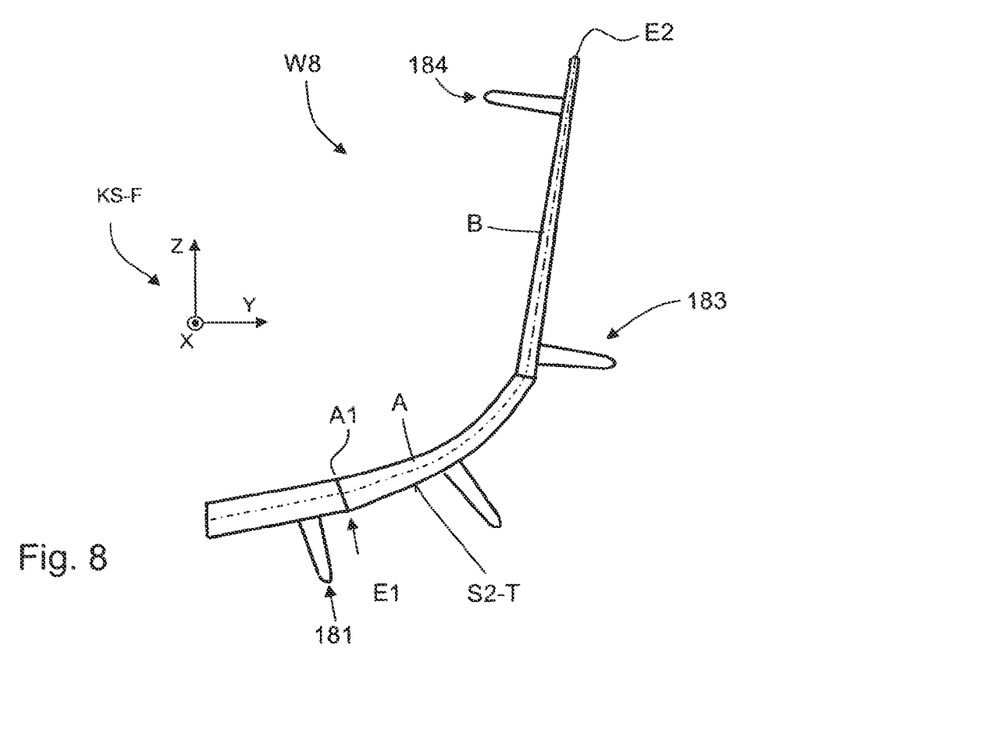
FIG. 8 shows a schematic view, generated on the basis of a direction of view that is opposed to the longitudinal axis of the aircraft, of an outer region of a further exemplary embodiment of the inventive wing with a wingtip device and four ancillary wing sections in accordance with the present disclosure, of which three are arranged on the lower side of the wingtip device, and one is arranged on the upper side of the wingtip device.

The embodiment of the wingtip device W8 represented in FIG. 8 likewise has a transition region A and an at least predominantly planar outer section B, which is attached to the transition region A in the YZ-plane with a kink. The wing T thereby has a first ancillary wing section 181 on the lower side S2-T of the wing in the region of the main wing H, a second ancillary wing section 182 on the lower side S2-T of the wing in the region of the transition region A, and a third ancillary wing section 183 on the lower side S2-T of the wing in the region of the outer section B. Furthermore this embodiment of the wingtip device W8 has a fourth ancillary wing section 184 on the upper side S1-T of the wing in the region of the outer section B, which lies further from the main wing root than the ancillary wing section 183 arranged on the lower side S2-T.

In general the arrangement of an ancillary wing section, such as the ancillary wing section 184 on the upper side of the wingtip device can be advantageous inasmuch as in the vicinity of the outer end E2 of the wingtip device the aerodynamic interference effects are small and the wingtip device in its flexible behaviour can be influenced advantageously by the ancillary wing section, in that, for example, the ancillary wing section can cause a bending of the wingtip device outwards. In accordance with further inventive forms of embodiment the ancillary wing sections 100 of a wingtip device are arranged at differing chordwise positions W-T of the winglet W. In particular the trailing edge Z-ET of at least one of the ancillary wing sections 100, as viewed in the direction opposite to the X-direction, can thereby proceed behind the trailing edge ET-W of the wingtip device W, or, if one of the ancillary wing sections 100 is arranged on the main wing, behind the trailing edge ET-H of the main wing.

While at least one exemplary embodiment has been presented in the foregoing detailed description of the present disclosure, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure, it being understood that various changes may be made in the function and arrangement of elements described in an exemplary embodiment without departing from the scope of the present disclosure as set forth in the appended claims and their legal equivalents.

The invention claimed is:

1. A wingtip device for a wing, the wingtip device comprising:
    an inner end attached to a main wing section of the wing;
    an outer end extending away from the inner end, in which a local dihedral of the wingtip device increases or reduces from the inner end to the outer end;
    a flow surface comprising a pressure-side flow surface and a suction-side flow surface, wherein the pressure-side flow surface and the suction-side flow surface extend between the inner end and the outer end of the wingtip device; and
    at least two ancillary wing sections arranged on the wingtip device, each of the at least two ancillary wing sections attached to the pressure-side flow surface of the wingtip device, and each of the at least two ancillary wing sections projecting outward and away from the pressure-side flow surface of the wingtip device in a local thickness direction of the wingtip device;
    wherein each of the ancillary wing sections projects from the pressure-side flow surface at a different height;
    wherein each of the ancillary wing sections has an inner surface facing towards a root of the wing and an outer surface directed in an opposite direction to the root of the wing;
    wherein each of the ancillary wing sections has a local central plane that is inclined at an angle less than 30 degrees relative to the local thickness direction of the wingtip device;
    wherein each of the ancillary wing sections has a root forming an interface with the pressure-side flow surface of the wingtip device; and
    the ancillary wing sections are spaced apart from one another in a wingtip spanwise direction between the inner end of the wingtip device and the outer end of the wingtip device.

2. The wingtip device according to claim 1, wherein a separation distance between each pair of interfaces of the at least two ancillary wing sections is at least 1.5 times the length of the shorter one of two ancillary wing sections forming the respective pair of interfaces of the at least two ancillary wing sections.

3. The wingtip device in accordance with claim 1, wherein with reference to a section through the wingtip device in a YZ-plane, at least one ancillary wing section is arranged on a side of the wingtip device, which generally has a convex curvature.

4. The wingtip device in accordance with claim 1, wherein an area of a surface of the ancillary wing section is less than 30% of an area of the flow surface of the wingtip device, or of a central plane of the wingtip device.

5. The wingtip device in accordance with claim 1, wherein an area of a surface of the ancillary wing section is greater than 5% of an area of the flow surface of the wingtip device, or of the central plane of the wingtip device.

6. The wingtip device in accordance with claim 1, wherein a length of the ancillary wing section at right-angles to a respective position of the flow surface of the wingtip device or of the wing, is less than 5% of the half-span of the wing.

7. The wingtip device in accordance with claim 1, wherein a length of the ancillary wing section at right-angles to a respective position of the flow surface of the wingtip device, or of the wing, is a minimum of 1.0% of the half-span of the wing.

8. The wingtip device in accordance with claim 1, wherein a thickness of the ancillary wing section is the same as, or less than, a local thickness of the wingtip device at the position at which the ancillary wing section is attached.

9. The wingtip device in accordance with claim 1, wherein the ancillary wing section is provided such that the length between a first end and an outer end of the ancillary wing section is at least one times as large as the greatest chord of the ancillary wing section.

10. The wingtip device in accordance with claim 1, wherein a taper of the ancillary wing section has a value in the range between 0.2 and 0.8, wherein the taper of the ancillary wing section is defined as a local wing chord at 10% of the total length of the ancillary wing section, as viewed from the inner end, with reference to the local wing chord at 85% of the total length of the ancillary wing section, as viewed from the inner end.

11. The wingtip device in accordance with claim 1, wherein a relative thickness of each ancillary wing section is between 6% and 15%, wherein the relative thickness of an ancillary wing section of the at least two ancillary wing sections is defined as a maximum thickness of the ancillary wing section relative to a greatest breadth of the ancillary wing section in the cross-sectional area of the ancillary wing section having the maximum thickness, and the maximum thickness is defined as a greatest height at right-angles to the greatest breadth.

12. A wing with a wingtip device, the wingtip device comprising:
- an inner end attached to a main wing section;
- an outer end extending away from the inner end, in which a local dihedral of the wingtip device increases or reduces from the inner end to the outer end;
- a flow surface comprising a pressure-side flow surface and a suction-side flow surface, wherein the pressure-side flow surface and the suction-side flow surface extend between the inner end and the outer end of the wingtip device; and
- at least two ancillary wing sections arranged on the wingtip device, each of the at least two ancillary wing sections attached to the pressure-side flow surface of the wingtip device, and each of the at least two ancillary wing sections projecting outward and away from the pressure-side flow surface of the wingtip device in a local thickness direction of the wingtip device;
- wherein each of the ancillary wing sections projects from the pressure-side flow surface at a different height;
- wherein each of the ancillary wing sections has an inner surface facing towards a root of the wing and an outer surface directed in an opposite direction to the root of the wing;
- wherein each of the ancillary wing sections has a local central plane that is inclined at an angle less than 30 degrees relative to the local thickness direction of the wingtip device;
- wherein each of the ancillary wing sections has a root forming an interface with the pressure-side flow surface of the wingtip device; and
- the ancillary wing sections are spaced apart from one another in a wingtip spanwise direction between the inner end of the wingtip device and the outer end of the wingtip device.

13. The wing according to claim 12, wherein in addition at least one ancillary wing section is arranged on the wing.

* * * * *